United States Patent [19]

Pettersson

[11] 4,382,373

[45] May 10, 1983

[54] APPARATUS FOR CALIBRATING TUBULAR ARTICLES

[75] Inventor: Björn O. A. Pettersson, Ystad, Sweden

[73] Assignee: AB Carbox, Ystad, Sweden

[21] Appl. No.: 357,793

[22] Filed: Mar. 12, 1982

Related U.S. Application Data

[62] Division of Ser. No. 252,948, Apr. 10, 1981, Pat. No. 4,339,935.

[30] Foreign Application Priority Data

Apr. 15, 1980 [SE] Sweden .................. 8002833

[51] Int. Cl.³ ............................ B21D 39/08
[52] U.S. Cl. .................... 72/57; 72/60; 72/63; 72/356; 419/26
[58] Field of Search ............ 29/420.5; 72/57, 60, 72/63, 402, 403, 354, 356

[56] References Cited

U.S. PATENT DOCUMENTS 3,719,479 3/1973 Flanagan .................. 29/420.5
4,032,335 6/1977 Zapf et al. ................. 29/420 UX

FOREIGN PATENT DOCUMENTS 2133724 of 0000 Fed. Rep. of Germany .
2230849 of 0000 Fed. Rep. of Germany .
316873 of 0000 Sweden .
322874 of 0000 Sweden .
1352061 5/1974 United Kingdom .
1470584 of 0000 United Kingdom .

Primary Examiner—Leon Gilden
Attorney, Agent, or Firm—Frishauf, Holtz, Goodman and Woodward

[57] ABSTRACT

An apparatus for calibration of tubular articles, especially cylinder linings for internal combustion engines, manufactured through isostatic compression of pulverulent metallic materials, comprises piston means for effecting an axial displacement between the tubular article and a mandrel which it surrounds during the calibration. Preferably, the tubular article is first subjected to a rather modest radial inwardly directed pressure which is increased after an axial relative movement between the mandrel and the tubular article has taken place.

8 Claims, 3 Drawing Figures

APPARATUS FOR CALIBRATING TUBULAR ARTICLES

This is a division of application Ser. No. 252,948, filed Apr. 10, 1981, now U.S. Pat. No. 4,339,935.

BACKGROUND OF THE INVENTION

The present invention relates to a method and to an apparatus for calibrating tubular articles consisting of a pulverulent metallic material which has undergone isostatic compression and a subsequent sintering operation. It is to be noted that while the invention is considered to be of special value in connection with the calibration of linings for the cylinders of internal combustion engines, its general field of use is much broader and covers all tubular articles manufactured as stated above.

In the Prior Art a tubular article of the type above specified, including cylinder linings, are calibrated by placing the lining around a cylindrical mandrel. For obvious reasons it is then necessary that the internal diameter of the lining exceeds the diameter of the mandrel by an amount sufficient to permit convenient mounting of the lining thereon. The calibration process involves subjecting the lining to radially inwardly acting forces striving at bringing the internal surface of the lining into intimate and accurate contact with the cylindrical surface of the mandrel. As is understood, this means that the internal diameter of the lining must be reduced by an amount corresponding to the initial clearance between the mandrel and the lining. This forced deformation of the lining generates inside its material reactional forces in the form of tensions tending to counteract the deformation. The tangible result of the presence of such internal stresses in the material may occur in two different forms which may be present separately or in combination.

A cylinder lining not yet calibrated generally exhibits significant irregularities in terms of wall thickness, diameter and circular form. If the inner diameter substantially exceeds the diameter of the mandrel, the lining cannot be deformed into intimate contact with the mandrel all around its circumference. Instead, within a greater or smaller sector the lining will bulge out from the mandrel or, differently put, a "fold" is formed. If, in addition thereto, one or both of the other two just-mentioned irregularities is present, then this undesired deformation is accentuated. Should the wall thickness of the lining be small at one place in the circumferential direction, this means an indication for the formation of a fold in that area. Correspondingly, if the lining blank when introduced into the calibration press deviates from a true circular form, this deviation will be amplified when the clearance between the mandrel and the lining is too great as just mentioned. It should also be observed that the lining blank may also have such variations in the direction of its longitudinal axis which may provoke local fold formations at different levels or, alternatively, that such folds become differently pronounced at different levels.

It has been found that even in such cases when the irregularities of the lining blank are not sufficiently great to cause the formation of folds when the lining is still surrounding the mandrel, they may be great enough to retain inside the material stresses which show up at a later stage, when the lining has been unloaded of the compression forces acting inside the press and has been removed from the mandrel. In either of the cases above discussed it will apparently be necessary to subject the calibrated lining also to a machining operation in order to ensure that its final dimensions will fall within the tolerance limits.

It is a primary object of the present invention to provide a method and an apparatus for calibrating tubular articles, especially linings for the cylinders of internal combustion engines, in such a way that the risk of a creation or continued presence of irregularities of the type here discussed is greatly reduced. For the sake of completeness and to avoid any misunderstanding it should be added that the term "fold" as used herein is not meant to be construed literally. In the context of the present invention the term just specifies that, within a certain portion of the circumference of the lining, there is a lack of complete contact between the surfaces of the lining and the mandrel.

SUMMARY OF THE INVENTION

According to the present invention, a method for calibrating a tubular article made of a pulverulent metallic material which has undergone isostatic pressing and subsequent sintering operation, comprises the steps of placing the article around a central mandrel in an isostatic press; subjecting the article first to a first press force directed radially inwardly of the article; then applying to the article an axially oriented force acting to displace the article axially relative to the mandrel; and then again applying to the article a force directed radially inwardly and greater than said first press force to press the article against the mandrel.

Apparatus for carrying out the above method for calibrating a tubular article made of a pulverulent metallic material which has undergone isostatic pressing and a subsequent sintering operation, comprises: an isostatic press which has a central mandrel; means for generating a press force acting radially inwardly towards said mandrel; and means arranged to apply an axially directed force to the article to cause an axially oriented relative movement between the article and the mandrel. Preferably, the means for applying an axially directed force to the article comprises at least one piston.

The invention is based on the realization that if the conventional calibration process, wherein the tubular workpiece is subjected to radially inwardly acting compression forces only, is supplemented with forces acting in the direction of the longitudinal axis of the mandrel, the accuracy of the calibration will be greatly enhanced making it, as a rule, superfluous to carry out also a machining, e.g. grinding or honing or both, to satisfy the tolerance requirement.

DETAILED DESCRIPTION

Figure 1:
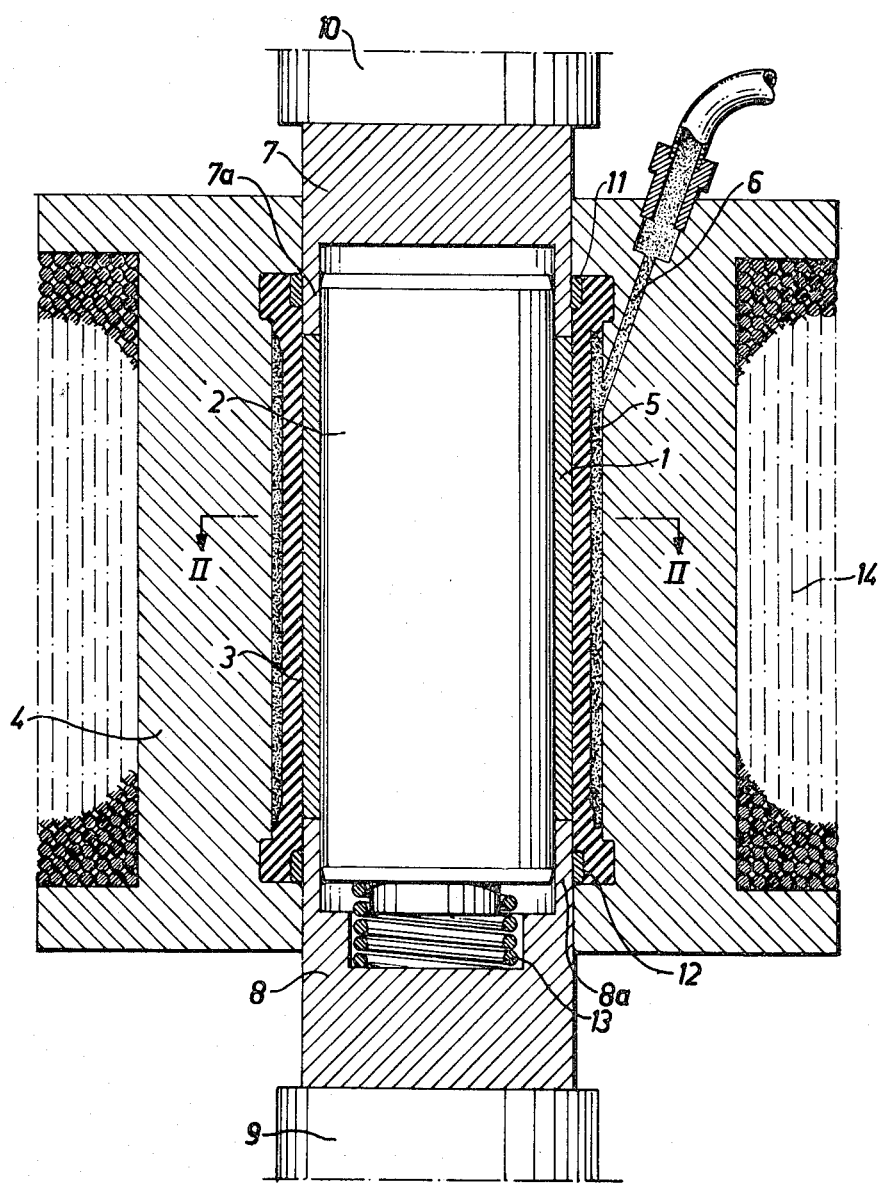
FIG. 1 shows a vertical cross-section through an apparatus according to one embodiment of the invention.
Figure 2:
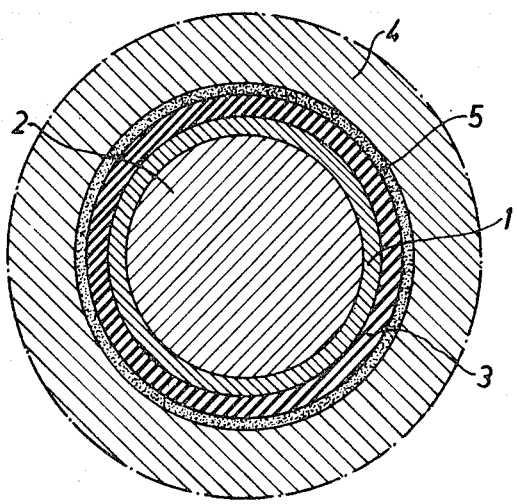
FIG. 2 shows a cross-section taken along the line II—II in FIG. 1.

The apparatus illustrated in FIGS. 1 and 2 is intended for the calibration of linings for the cylinders of internal combustion engines. A cylinder lining 1 to be calibrated has been mounted so that it surrounds a solid calibration mandrel 2 which is made of steel and the outer surface of which has been polished to a mirror-smooth finish. The outer wall of lining 1 is surrounded by a rubber sleeve 3 mounted inside a thick-wall press jacket 4 the press chamber of which is shaped so that, between its inner wall and the outer wall of the rubber sleeve 3 there is defined a space of annular cross-section housing hydraulic pressure fluid 5. The pressure fluid 5 is supplied to the press chamber via a bore 6 through the jacket wall and it is delivered by a suitable pressure source (not shown).

When the hydraulic fluid 5 is pressurized, the corresponding pressure will, via rubber sleeve 3, force cylinder lining 1 into intimate contact with mandrel 2. The components of the apparatus so far described belong to the prior art. The significant difference between the prior art and the principle of the present invention is the following one. In prior art equipment the mandrel 2 is generally integral with the press jacket 4 at its bottom end. Also, when the cylinder lining 1 has been mounted inside the calibration press, the opening above the top end of the mandrel is closed by a plug rigidly connected to the jacket. In contrast thereto, according to the illustrated embodiment of the invention here described for illustration purposes, a piston-like member 7 and 8, respectively, penetrates the press jacket 4 at both ends of the mandrel 2. The lower piston 8 is supported by a die 9, whereas the top surface of the upper piston 7 contacts the bottom of a plunger 10 which is axially displaceable, preferably by means of a hydraulic cylinder. At its inner end, as seen in the axial direction, each of pistons 7 and 8 has an annular flange 7a and 8a, respectively, the inner and outer diameters of which substantially agree with the corresponding dimensions of lining 1. Between piston 8 and mandrel 2 there is mounted a compression spring 13. The external surfaces of flanges 7a and 8a are surrounded by sealing rings 11, 12, mounted in corresponding grooves in rubber sleeve 3. Press jacket 4 is, in a manner known per se, surrounded by a girdle 14 of tension-biased steel wires.

The following description of the mode of operation of the apparatus above described will simultaneously be an account of how the method according to the invention may be carried out.

First, plunger 10 and piston 7 are held in such positions so as to permit the introduction into the apparatus of a lining 1 to be calibrated. The lower rim of the lining 1 will then rest against the top surface of flange 8a. Then, plunger 10 and piston 7 are lowered so that the bottom rim of flange 7a will contact the top rim of lining 1. As appears from FIG. 1, the horizontal end surfaces of flanges 7a and 8a are located a substantial distance inwards of the corresponding end surfaces of mandrel 2.

Second, the fluid 5 in the press chamber of the apparatus is pressurized. This sets up a radially inwardly acting pressure forcing lining 1 into intimate contact with the polished cylindrical surface of mandrel 2. Next, the working cylinder of plunger 10 is pressurized whereby there is set up a force striving to displace piston 7 downwards. As is understood, this means that lining 1 is displaced axially relatively mandrel 2, the corresponding movement of piston 8 being accommodated for by spring 13. It should be especially observed that the initiation of the axial movement just mentioned may be either before or after completion of the radial compression step just described.

Third, the inward radial pressure is increased to a higher value or reapplied but at such a higher value.

The probable theoretical explanation behind the advantageous calibration results obtained in the carrying out of the present invention is as follows. If, during the initial stage of the radial compression operation, there would within a portion of the circumference remain or arise a small clearance between the mandrel 2 and the lining 1, the axial displacement will loosen the grip between the mandrel 2 and the rest of the lining 1, whereafter the increased inward radial pressure, applied during the second stage of the radial compression, will force the lining 1 into contact with the mandrel 2 uniformly all around the circumference, whereby a high accuracy in terms of circular form is secured.

Figure 3:
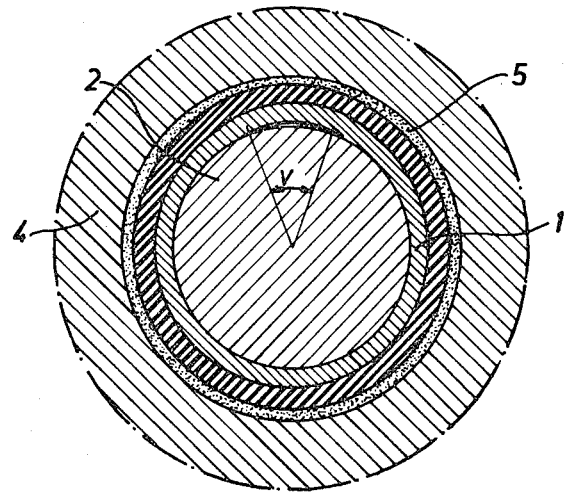
FIG. 3 corresponds to FIG. 2 but relates to the prior art, i.e. to a calibration method in which the tubular workpiece is subjected only to radial pressures but not to any axial pressure.

The difference between the prior art and the principle according to the present invention appears from a comparison between FIG. 3 and FIG. 2. In FIG. 3—which accordingly represents the prior art—there has, heavily exaggerated for illustration purposes, been shown a fold or bulge the angular extension of which has been marked "v". Typically, v may amount to e.g. 20°-30°. Since, during the initial step of the radial compression operation, the remainder of the lining 1, i.e. the portion outside the just-mentioned sector, has first reached contact with the mandrel, it tends to compensate for the diameter increase by expansion in the other directions, including the circumferential directions. In this way there is within sector v generated a tangentially oriented force which, due to the presence of the bulge, also includes a component directed radially outwards. The result of this is that the radially inwardly acting compression forces will not at all, or in any case not permanently, deform the bulge into contact with the mandrel. However, when according to the invention the radial compression force is either first discontinued or supplemented by the axial force and the full compression force not applied until after an axial relative movement has taken place, the end result will be as shown in FIG. 2.

The magnitude of the pressures applied varies as a function of the dimensions and material composition of the articles under treatment. As such variations may cover a wide range, the figure of 5 kilobars now mentioned is only indicative of the order of magnitude of the radial pressure used. Also as far as the structural components of the apparatus are concerned, many variations may be made within the scope of the claims.

I claim:

1. Apparatus for calibrating a tubular article (1) made of a pulverulent metallic material which has undergone isostatic pressing and a subsequent sintering operation, comprising:

an isostatic press which has a central mandrel (2) on which is mounted said tubular article;

means (3, 4) for applying a first press force to said tubular article mounted on said mandrel, said first press force acting radially inwardly towards said mandrel;

means (7, 8) for applying an axially directed force to said tubular article (1) after application of said press force to cause an axially oriented relative movement between said tubular article (1) and said mandrel (2); and means for applying a second press force to said tubular article after application of said axially directed force, said second press force acting radially inwardly towards said mandrel and being of greater magnitude than said first press force.

2. The apparatus of claim 1 wherein said means for applying said axially directed force to said tubular article comprises piston means (7, 8).

3. The apparatus of claim 2 wherein said piston means includes a pair of pistons at respective opposite ends of said tubular article.

4. The apparatus of claim 2 or claim 3, wherein said piston means includes at least one piston (7, 8) having an annular flange (7a, 8a) extending axially from the inner end of said at least one piston, the annular flange having an inner wall which is adapted to contact the mandrel (2), the annular flange contacting an end of said tubular article and pressing against said end of said tubular article for causing an axially oriented movement of said tubular article relative to said mandrel.

5. The apparatus of claim 3, further comprising resilient means (13) coupled between an end of said mandrel (2) and at least one (8) of said pistons (7, 8).

6. The apparatus of claim 5, wherein the other (7) of said pair of pistons is located at the opposite end of said mandrel (2) from said at least one (8) of said pistons, said other piston having an annular flange (7a) extending axially from the inner end of said other piston, said annular flange (7a) of said other piston having an inner wall which is adapted to contact the mandrel (2), said annular flange (7a) of said other piston contacting an end of said tubular article and pressing against said end of said tubular article for causing an axially oriented movement of said tubular article relative to said mandrel.

7. The apparatus of claim 6, wherein said at least one (8) of said pistons comprises an annular flange (8a) extending axially from the end of said at least one piston which faces said mandrel (2), the annular flange (8a) of said at least one piston having an inner wall which is adapted to contact the mandrel and the annular flange (8a) of said at least one piston contacting an end of said tubular article which is opposite the end of said tubular aryicle contacted by said annular flange (7a) of said other piston (7).

8. The apparatus of claim 1, wherein said isostatic press defines a chamber, the outer wall of which is in the form of a tubular jacket (4), a pressure-generating fluid being housed in the chamber of said isostatic press, said isostatic press further comprising a girdle of tension-biased steel wires surrounding said outer wall of said chamber.

* * * * *